United States Patent [19]

Mehrotra

[11] Patent Number: 5,030,433

[45] Date of Patent: Jul. 9, 1991

[54] PROCESS FOR PRODUCING PURE AND DENSE AMORPHOUS SYNTHETIC SILICA PARTICLES

[75] Inventor: Vikram P. Mehrotra, Terre Haute, Ind.

[73] Assignee: International Minerals & Chemical Corp., Northbrook, Ill.

[21] Appl. No.: 221,025

[22] Filed: Jul. 18, 1988

[51] Int. Cl.$^5$ .......................... C01B 33/12; C22B 1/14
[52] U.S. Cl. ................................. 423/335; 23/313 AS; 106/482
[58] Field of Search .................... 23/313 AS; 423/340, 423/335; 106/484, 485; 65/18.2, 18.4

[56] References Cited

U.S. PATENT DOCUMENTS

| | | | |
|---|---|---|---|
| 2,883,347 | 4/1959 | Fisher | 272/502 |
| 3,301,635 | 1/1967 | Bergna | 423/335 |
| 3,853,574 | 12/1974 | Ferrigno | 106/485 |
| 4,042,361 | 8/1977 | Bihuniak et al. | 65/18.3 |
| 4,200,445 | 4/1980 | Bihuniak et al. | 65/18.2 |
| 4,384,896 | 5/1983 | Aitein et al. | 106/485 |
| 4,683,128 | 7/1987 | Orii et al. | 423/340 |

OTHER PUBLICATIONS

Kirk-Othmer, "Encyclopedia of Chemical Technology", 3d Ed., (1982), vol. 20, pp. 748-766 and 782-817.

Primary Examiner—Gary P. Straub
Attorney, Agent, or Firm—Wendell Ray Guffey; Thomas L. Farquer; William J. Fisher

[57] ABSTRACT

A method of producing pure and dense amorphous fused synthetic silica. Silica of desired purity is wet pelletized or agglomerated to form particles having an average particle size of between about 5 and 2500 microns. These particles are calcined to volatilize impurities and increase density to at least about 0.9 g/cm$^3$. Calcined particles are classified by size or reduced in size if desired or needed by grinding in such a way that the purity of the product is maintained.

27 Claims, 4 Drawing Sheets

PROCESS FOR PRODUCING PURE AND DENSE AMORPHOUS SYNTHETIC SILICA PARTICLES

BACKGROUND OF THE INVENTION

1. Field of the Invention

This invention relates to a method of producing pure and dense fused synthetic silica particles from a high purity amorphous silica powder. More particularly, the invention relates to a method of agglomerating pure silica to form coarse particles, then calcining the particles to increase density and volatilize impurities, essentially without devitrification. Particle size of the final product can be adjusted as desired by air classification and/or grinding in a jet mill. The classifier and the jet mill are lined with abrasion resistant lining such as polyurethane. Polyurethane contamination of the product can be easily eliminated by oxidation.

2. Description of Related Art

Silica is an important article of commerce useful for a variety of purposes. However, synthetic silica often has a low bulk density which typically is caused by the low specific gravity of the synthetic silica particles. Precipitated silica and silica derived from a sol-gel process have a highly porous structure which results in low specific gravity of the silica. Further, silica from these and other sources, including silica from pyrogenic techniques, tends to form fine, dust-like particles which escape during handling, causing contamination of the atmosphere and loss of product. Such particles are transported in commerce only with difficulty. Silica particles from these sources tend to resist free flow from storage containers such as silos, bins, and hoppers. Typically, mechanical assistance in the form of bin vibrators and similar devices is required in the transfer of such silica.

Various techniques for dealing with these difficulties have been disclosed. For example, U.S. Pat. No. 3,894,882 discloses a method said to achieve optimum bulk density while improving characteristics such as flowability and attrition. As taught therein, the material is wet pelletized in a tumbling drum to achieve a specified particle size distribution said to afford efficient packing of the particles. However, only minimal density improvement can be obtained when this technique is used with a highly porous material such as synthetic silica because the technique does not affect the specific gravity (bulk density) of the particles themselves which are agglomerated to form the pellet.

Compression molding of pellets also is known, but this technique does not maximize density because it does not reduce the porosity of the individual particles. Typically, binding agent and mold lubricant are utilized to ensure mutual adhesion of the particles and easy release of the pellet from the mold. For example, U.S. Pat. No. 4,256,682 discloses that silica treated with ammoniacal solution to form a dispersion is suitable for compression molding. Ammonia is evolved when the molded pellet is heated. Pellets produced by this method typically have a specific surface area of greater than about 175 $m^2/g$ when fresh, and at least about 90 $m^2/g$ after one week of aging.

Certain uses of silica require very high purity material. For example, silica used in the encapsulation or packaging of electronic computer chips must have extremely low levels of metal impurities, must have bulk density greater than 1 $g/cm^3$, and must be essentially free of crystalline phases. In addition, the desired average particle size is 20 microns or less, with 100 percent smaller than 75 microns.

Typical of these uses is very large scale integrated (VLSI) microchip applications, where chip manufacturers require silica having extremely low concentrations of certain radioactive elements. For example, uranium and thorium concentrations must be of the order of less than 1 part per billion (ppb). The maximum acceptable level of ionic impurities, including cations such as boron, calcium, cobalt, chromium, copper, iron, potassium, magnesium, manganese, sodium, nickel, vanadium, and zinc, and anions containing phosphorus and sulphur, typically is less than 10 parts per million (ppm), and often is below 1 part per million. The concentration of halogens should be minimized to reduce chip corrosion and increase chip life.

Other uses for high purity silica material include precision laser optics, fiber optics, and advanced ceramics, including diffusion tubes and crucibles. These uses now are satisfied predominantly by natural silica sources such as quartz. Although natural quartz is a crystalline form of silica, such quartz is converted to "fused quartz" during the manufacturing process employed to make items such as crucibles and diffusion tubes.

A method of producing pure silica is described in U.S. Pat. No. 4,683,128. The method comprises coagulating a viscous aqueous alkali silicate solution by passing it through a spinning nozzle into a water-soluble organic medium to produce fine fibrous silica gel. The gel is treated first with an acid-containing solution, then with water, to extract impurities. The surface of the fibrous gel is cracked and crazed, i.e., is fissured, making acid and water purification treatment especially effective. Pure silica thus produced can be heat-treated at a temperature greater than about 1000° C. The cracked and crazed fiber crumbles upon heating to yield fine particles of somewhat increased density (0.55 $g/cm^3$) because the porosity is reduced by the heat treatment.

Size reduction and classification techniques typically introduce impurities to the particles. Autogeneous comminution techniques typically introduce impurities from the liner of the container or require complex apparatus, such as that disclosed in U.S. Pat. No. 1,935,344. Apparatus such as that disclosed in U.S. Pat. No. 3,184,169, wherein material is pneumatically pulverized by impingement against a surface, introduces large quantities of impurities. Contamination occurs even when both the nozzle through which particles are introduced and the interior surfaces of such an apparatus are lined with abrasion resistant material. Such contamination is greater than allowable in the above-described high-purity uses.

None of the above-described techniques are suitable for producing pure, dense, amorphous synthetic silica suitable for the above-described uses, essentially free of crystalline phases when first produced, after aging, and after fusion. Techniques such as compression molding typically require binding agents which degrade the purity of the silica and, to a certain degree, react with the molded material. Known techniques of unpressurized particle agglomeration do not achieve significant density improvement when agglomerating a porous silica. Similarly, the technique described in U.S. Pat. No. 4,683,128 is unsatisfactory for a number of reasons. Not only does the product have a low bulk density of about 0.55 g/cm³, but also the process requires a particular form of silica, i.e., a coagulated fibrous gel prepared in accordance with a complicated technique, and from which impurities have been extracted with hazardous acids.

It is an object of this invention to provide a method of producing pure and dense amorphous fused synthetic silica.

It is a further object of this invention to provide a method of agglomerating synthetic silica to form coarse particles, then calcining the particles to volatilize impurities and increase density, essentially without devitrification.

It is yet another object of this invention to provide a method of producing pure and dense amorphous fused synthetic silica without using binders which contaminate the silica.

It is still another object of this invention to provide a method of producing pure and dense amorphous fused synthetic silica with a minimum of devitrification.

It is a still further object of this invention to provide a method of producing pure and dense amphorous fused synthetic silica having a density greater than about 0.9 g/cm³ before sizing and classification.

It is a still further object of this invention to provide a method of producing coarse, pure, dense, amorphous fused synthetic silica which can be ground to produce silica suitable for electronic chip packaging, i.e., a silica with low uranium and thorium concentrations, essentially no crystalline phase, and bulk density of greater than about 1 g/cm³.

SUMMARY OF THE INVENTION

In accordance with these and other objects, this invention relates to a method of producing pure and dense amorphous fused synthetic silica. Synthetic silica of desired purity is wet pelletized or agglomerated to form particles having an average particle size of between about 5 and 2500 microns. These particles are calcined to volatilize impurities and increase density to at least about 0.9 g/cm³. Calcined particles are classified by size or reduced in size if desired or needed by grinding in such a way that the purity of the product is maintained.

DETAILED DESCRIPTION

Figure 1:
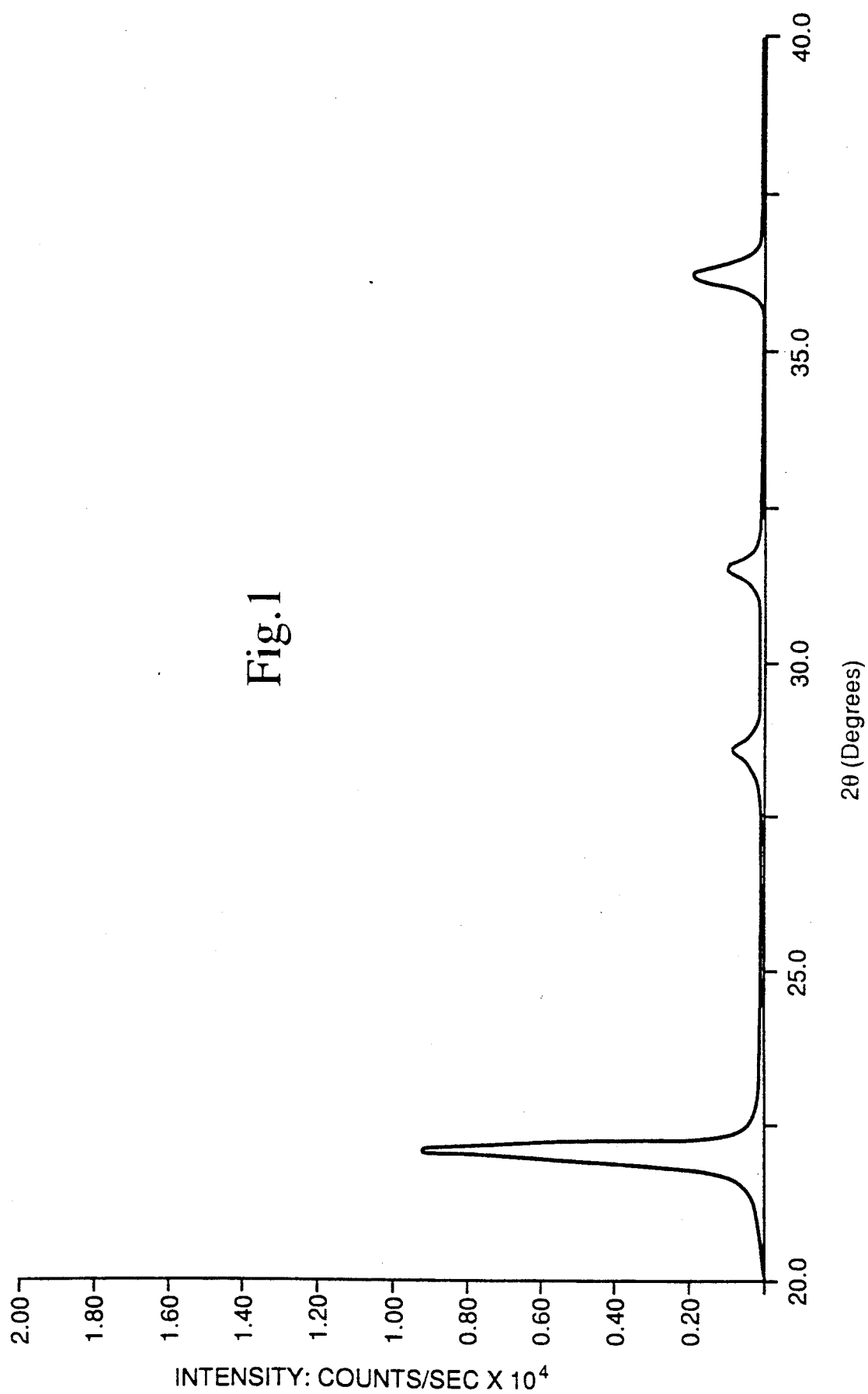
FIGS. 1-3 illustrate the effect the composition of the atmosphere has on the structure of the calcined product.

This invention is based on the discovery of a method for producing pure, dense, amorphous fused synthetic silica from synthetic silica particles. Synthetic silica particles having a desired purity are agglomerated in a wet pelletizer or other suitable device until the particles achieve a size between about 5 and 2500 microns. These particles are calcined in an inert atmosphere at a temperature of at least about 1000° C. It has been discovered that agglomerating the synthetic silica before it is calcined in the inert atmosphere essentially precludes devitrification of the silica and sintering of silica particles into larger chunks, which are difficult to handle and process and which tend to adhere to the furnace lining. Calcination after agglomeration both decreases the concentration of volatile materials and increases the density of the particles by reducing pore volume. The final particle size of the product is adjusted by air classification and/or jet milling.

Production of pure, dense, amorphous, synthetic silica particles having a pre-selected particle size range is difficult. Although methods of producing silica which has the required purity are known, silica thus produced typically is not sufficiently dense and does not have the desired particle size range. Calcination of such silica at a temperature between about 1200°-1500° C. to increase the density of the particles yields 1-6 inch hard chunks which tend to adhere to the furnace lining. The chunks must be crushed in a crusher prior to grinding to the desired average particle size. Not only is the crushing of these chunks difficult because the particles are very hard and abrasive but also there is no commercially available crusher that will reduce the particle size without introducing contamination. More important from the standpoint of certain end use applications, the high specific surface area of these silica particles tends to result in devitrification during calcination.

It has been discovered that agglomeration of such silica before calcination enables production of amorphous silica particles which can be ground in commercially available grinding mills to the desired size without the introduction of a significant amount of impurities. Agglomeration before calcination reduces the specific surface area of the silica, thereby essentially eliminating the tendency to form chunks and reducing the tendency of the silica to devitrify. To reduce the size of agglomerated particles, crushing before grinding is not required. Thus, a potential source of contamination is eliminated. Further, it has been discovered that calcined silica can be comminuted in, e.g., a jet mill lined with non-contaminating material. For example, a quartz liner would be acceptable because it would not introduce impurities to the ground silica, but quartz liners are not durable. However, a material such as polyurethane, which subsequently can be removed from the silica by oxidation without leaving residue, is preferred.

Silica suitable for use in the method of this invention is any amorphous form of synthetic silica which exists as discrete particles. The particular source of this silica forms no part of this invention. For example, silica produced in accordance with the method disclosed in U.S. Pat. No. 4,683,128 can be utilized in the method of this invention. The sole additional requirement for this material is that it have the purity desired of the final product. Because the method of this invention introduces only insignificant amounts of impurities to the particles, the purity of product is essentially equal to the purity of the starting material.

Silica used in integrated circuit construction, e.g., as filler for encapsulation products, must be pure for various reasons. Low concentrations of radioactive impurities minimize alpha-particle emissions which could cause errors in the functioning of the chip. Contaminants which degrade the quality of the ultimate product, e.g., halogens, which cause corrosion, should also be present only at extremely low concentrations. For example, the fluorine concentration should be less than about 10 wppm, preferably less than about 5 wppm, and more preferably less than 3 wppm. Also, for these uses, amorphous silica is much preferred over crystalline silica because the former has a significantly lower coefficient of thermal expansion than the latter. Thus, contaminants such as water-soluble sodium, potassium, and fluorine, which, under calcination conditions, significantly accelerate formation of cristobalite, a crystalline phase, must be minimized.

In accordance with the present invention, the pure, amorphous silica first is agglomerated to produce particles of a size between about 5 to 2500 microns (depending upon the size of the feed particles). Particle agglomeration can be accomplished in many of the commercially-available apparatus suited for this purpose. The only limitation on agglomeration apparatus is that it be lined with material, such as polyurethane, which is abrasion-resistant and which can be removed in a subsequent treatment step if the silica particles become contaminated by the lining material.

Preferably, silica is pelletized in a tumbling device such as disc-type or drum-type pelletizer. Such devices are known in the art. One example of a suitable device is the DP-14 Agglo-Miser, manufactured by Mars Minerals Corp., Valencia, Pa. 16059. Other suitable pelletizers or granulators may be used. Luwa Manufacturing Company model Spartan 2H is a suitable granulator, and a product called a "Turbulator", made by Ferro-Tech, Wyandotte, Mich. 48192, is also acceptable, provided the product purity is maintained. Pin mixers, spray dryers, and fluidized bed agglomerators are also suitable for use in the method of this invention.

In accordance with the method of this invention, agglomerated uncalcined particles, also called "green" particles, are first dried at low temperature, to remove excess water, then are calcined at higher temperatures to remove volatile impurities and increase density. Thereafter, the particles can be ground, if necessary, and classified by size to obtain a desired particle size distribution.

Agglomeration, drying, and calcination are carried out under conditions which essentially preclude devitrification. It has been discovered that two-stage calcination, wherein volatile impurities are removed at an intermediate temperature, followed by densification at a higher temperature, is especially effective at achieving these goals while minimizing devitrification. Because agglomeration and drying conditions typically are much milder than calcination conditions, fewer precautions against devitrification are required during the agglomeration and drying periods. The tendency to devitrify is insignificant at temperatures less than about 800° C.

The presence of water vapor, oxygen, or air during calcination encourages the formation of crystalline phases, such as cristobalite, at calcination temperature. Therefore, these components should be eliminated from the atmosphere before calcination. Preferred atmospheres which minimize devitrification in accordance with the method of this invention are nitrogen, helium, argon, other inert gasses, and mixtures thereof. Devitrification-minimizing atmospheres can be used at any temperature. Desirably, such an atmosphere is used when the temperature exceeds about 800° C., and preferably is used at temperatures above about 1000° C.

Those skilled in the art of agglomeration of non-selfadherent particles recognize that a fluid typically is utilized in the apparatus as an agglomerating agent or binder. The binder conditions the surface of the particles to develop adhesive properties, but, for the purposes of this invention, preferably does not react with the particles. Although various materials, such as gums, clays, and starches, are known to be suitable agglomerating agents, addition of these substances, which leave a residue on the agglomerated particles, is contrary to the purpose of the invention. For the purpose of this invention, a suitable binding agent is one which develops sufficient mutual adhesion at the surface of the individual particles without contaminating the particles.

In the practice of this invention, water is the preferred binding agent, as it develops requisite mutual adhesion of the silica without reacting with it. Consistent with the purpose of this invention, the water should be essentially free of the above-described impurities which would contaminate the silica. For convenience, such water is referred to herein as "high purity water," or simply "water."

The quantity of water required to achieve the binding effect depends upon the nature of the particles. Typically, the quantity of binding agent is up to about 200 wt. percent, preferably between about 50 and 150 wt. percent, of the quantity of dry silica. The exact quantity of water also depends upon the desired particle size of the product (generally, more liquid yields larger particles) and the apparatus utilized to form the particles. For example, material which is spray dried to agglomerate the particles can tolerate a greater quantity of liquid than can material treated in a disc- or drum-type pelletizer. The minimum quantity of water must be sufficient to yield the degree of mutual adhesion required to produce particles. The maximum quantity is that quantity which causes loss of mutual adhesion and prevents formation of agglomerate.

The minimum quantity of water preferably is at least about 1 wt. percent, more preferably is at least about 5 wt. percent, based on the weight of the silica being pelletized. Those skilled in the art recognize that typically the quantity of water utilized in a drum-type or disc-type agglomerator ranges up to about 150 wt. percent, preferably is between about 20 and 150 wt. percent, more preferably is between about 40 and 140 wt. percent, and most preferably is between about 100 and 120 wt. percent, based on the dry weight of silica. Practitioners recognize that the optimum quantities are dependent upon the characteristics of the material being agglomerated and can be determined by routine experimentation.

The water used in disc- and drum-type agglomerators may be either liquid or vapor. Thus, steam, or mixtures of steam and liquid water, can be utilized to provide the required moisture. Silica to be pelletized typically will be provided at ambient temperature (i.e., between about 15° and 30° C.). If steam is utilized, it will condense onto the silica to provide the moisture necessary to achieve mutual adhesion of the particles.

Use of steam to provide the required moisture is advantageous for various reasons. Steam provides very small droplets of moisture, and thereby promotes formation of a greater number of particles per unit mass. Because use of steam also raises the temperature of the treated silica, less energy will be required to dry the silica during subsequent treatment. Further, use of steam encourages mutual adhesion of particles.

Process conditions under which agglomeration is conducted vary over wide ranges of pressure and temperature. Whereas most agglomeration techniques are operated at approximately atmosphere pressure, for the practice of this invention, the agglomeration can operate in a vacuum or at superatmospheric pressure. For convenience, however, the agglomeration is carried out at approximately atmospheric pressure. The temperature in the agglomerator must be above the freezing point of the binding agent, and must not be so high as to damage the silica, as described above.

The period required for the agglomeration depends upon the desired pellet size and the agglomeration technique being utilized. For example, particle size is proportional to length of treatment in disc- and drum-type agglomerators. That is, typically, larger particles require longer periods in such agglomerators. However, spray drying does not require a long period, and the length of that period is fixed by the requirement that the binder be essentially completely evaporated within the apparatus. Those skilled in the art will easily determine the treatment period required to produce the preselected particle size.

Particles produced in accordance with the method of this invention preferably have sizes ranging from about 5 to about 2500 microns, more preferably between about 50 and 1000 microns. The specific particle size of the agglomerated silica depends on the particle size of the feed materials. The precise average particle size of particles produced by this method can be selected within this range. Also, particles can be subjected to size reduction in a polyurethane-lined jet mill to generate any desired ultimate particle size distribution. Polyurethane contamination, if introduced and detrimental in the application sought, can be burned off.

Those skilled in the art will recognize that there will be a difference in size between "green" and calcined particles because green particles shrink upon calcination. The degree of shrinkage depends upon a number of characteristics and properties of both green and calcined particles, and, therefore, must be determined on an individual basis. For example, the degree of shrinkage will be affected, inter alia, by the density of the silica particles before agglomeration, the degree of compaction, and the density achieved in the calcined particles. It is within the skill of a practitioner to operate an agglomerating apparatus in accordance with the guidelines described in this specification to produce agglomerated particles which yield the pre-selected average size upon calcination.

Green silica particles first are dried at a temperature above the boiling point of the binder, preferably about 110° C. at about atmospheric pressure if water was the binding agent, until the major portion of the binder has been vaporized. Any dryer known in the art conveniently is used for this drying step, provided that mechanical action in the dryer does not break the pellets during drying. Green particles can also be dried in a pre-heater portion of a calciner. Equipment suitable for superatmospheric pressure or for vacuum operation is more expensive to build and operate, and is unnecessary in the practice of the method of this invention. Thus, the preferred pressure for this drying step is atmospheric. However, if other than atmospheric pressure is utilized, the temperature at which the particles are dried should be adjusted to ensure that the temperature in the dryer exceeds the vaporization temperature of the binder at that pressure.

At temperatures below about 800° C., devitrification usually does not occur. Therefore, the atmosphere in the dryer typically is air, but any atmosphere essentially inert to silica at the lower dryer temperature, such as nitrogen, oxygen, helium, argon, neon, krypton, xenon, or any combination thereof, can be utilized.

Those skilled in the art recognize that various factors, including particle size distribution, affect the average bulk density of a particulate product. For example, a high concentration of fines (e.g. particles less than about 5 microns) reduces the average bulk density. Therefore, it is difficult to establish a minimum average bulk density for particles of the invention. However, dried particles are calcined to decrease the concentration of volatile impurities such as fluorine and ammonia and increase the bulk density of the pellets to at least about 0.9, preferably at least about 1.0, more preferably at least about 1.1, and most preferably at least about 1.2, g/cm$^3$. The temperature of the particles is raised to between about 1000° and 1400° C. in a fashion which essentially precludes devitrification and ensures continuing purity. Volatile impurities, such as fluorine and ammonia, also are removed. Grinding of these calcined pellets to generate silica having average particle size and size distribution suitable for use in chip encapsulation generally results in a powder with bulk density of greater than about 1.2 g/cm$^3$.

The furnace in which the particles are calcined should have saggers (liners) made from material which has high strength at elevated temperatures, resistance to thermal shock, and which does not introduce impurities to the silica. Typical of such material are high purity silicon carbide or silicon nitride. Fused quartz, although suitably pure, typically can be used only at a temperature below about 1200° C., preferably below 1100° C., because it has relatively low strength and thermal shock stability in repeated applications at higher temperatures. Alumina saggers typically are unsatisfactory because they introduce aluminum, sodium, potassium, and uranium to the silica, and do not have sufficient mechanical strength and thermal shock resistance. Various bonded silicon carbide products (oxynitride-, nitride- and zirconium-bonded) are unsatisfactory because they introduce unacceptable contaminants. However, suitable liner products including, for example, bonded silicon carbide products which do not introduce contaminants, will be apparent to those skilled in the art.

Any furnace which can achieve the required temperatures and which can be lined with high purity saggers is acceptable for use in this invention. Examples of such furnaces include box furnaces, tunnel and rotary kilns, rotary calciners, and flame torches. Apparatus for sintering particles can be used in the method of this invention.

It has been discovered that devitrification is minimized by changing the temperature of the silica during calcination as quickly as possible, especially when the calcination temperature is greater than about 1000° C. High rates of temperature change suppress formation of crystalline phases.

In accordance with the method of this invention, a two-step calcination is utilized to maximize removal of impurities and minimize devitrification. After the inert atmosphere is established, the temperature of the silica is raised to an intermediate level for a period sufficient to volatilize volatile substances such as fluorine, ammonia, and the like. Then, the temperature of the silica is raised for a relatively short duration to increase the density of the silica particles. Higher temperatures and longer periods yield greater density increases. As may be expected, conditions which yield the greatest bulk density also induce the highest degree of crystallization. With the guidance provided herein, however, one skilled in the art will be able to balance the tendency to form crystalline phases with the increase in the average bulk density of the pellet to attain particles having the desired characteristics.

The first step is carried out at a temperature of between about 1000° and 1100° C. At 1000° C., a period as short as about 0.5 hour may be sufficient to remove volatile components associated with the silica. For a given degree of volatile component removal, shorter time will be required at higher temperature. Within the guidelines presented here, those skilled in the art will recognize that lengths of periods and temperatures within the above-described range may be manipulated, with the guidance provided herein, to achieve the desired level of volatile contaminants.

The second step is carried out at a temperature between about 1250° and 1400° C., preferably between about 1300° and 1400° C. At 1300° C., a period of between about 0.5 to 2.5, preferably between about 1.5 to 2.5, and more preferably about two hours, is utilized. However, at 1400° C., a period of between about 0.25 to 0.75, preferably between about 0.25 and 0.5 hours, is sufficient to increase the density of the silica pellets to at least about 0.9 g/cm$^3$. Those skilled in the art can, with the guidance provided herein, determine suitable periods for temperatures elsewhere in the range.

It has been discovered that the degree of devitrification expected during calcination is related to the rate at which the temperature is changed when the temperature is greater than about 1000° C. Under mild conditions, i.e., the shortest periods at the lowest temperatures, the rate at which temperature is changed is not important. However, it has been discovered that devitrification during calcination is essentially precluded by raising or lowering the temperature at a rate exceeding about 9° C. per minute, preferably at least about 20° C. per minute, and more preferably at least about 30° C. per minute.

The upper limit on rate of temperature change is set only by limitations of the apparatus, such as the ability of the apparatus to provide heating or cooling capacity, the resistance of the apparatus to thermal shocks, and the like. The rate at which temperature can be changed may be adjusted as far as the equipment is capable of handling, without fearing development of cristobalite phase.

Calcination under the conditions described herein yields particles having dimensions between about 5 to 2500 microns depending upon the feed particle size, density at least about 0.9 g/cm$^3$, and less than about 3 wppm fluorine, as determined by the Parr Bomb analytical method. In accordance with this analytical method, 2 grams of silica and 20 grams of water are heated to 160° C. for 20 hours in a Parr bomb. Fluorine is determined by ion chromatography of the extract. The density increase results from reduction of the pore volume. These calcined particles may be classified by size using classification techniques which maintain the purity of the particles, such as screening utilizing plastic screen or cyclonic separation utilizing a polyurethane lined cyclone. Particles may also be reduced in size to achieve the desired size reduction, so long as the purity of the product is maintained. Often, sized products have a density of greater than about 1.2 g/cm$^3$.

Silica particles may be comminuted in any device for particle size reduction which can be lined with a material which does not permanently contaminate the silica. For example, quartz is an acceptable liner because quartz does not "contaminate" pure silica. However, quartz is not durable, and quartz liners must be replaced frequently. The comminution device preferably is lined with a durable material which can be removed from the silica particles. A preferred abrasion-resistant material is polyurethane, which can be removed from silica particles by oxidation under conditions which do not degrade the silica. Other durable, non-contaminating materials are known to those skilled in the art.

The preferred comminution device is a fluid-energy jet mill having an abrasion-resistant polyurethane lining. Typically, the silica particles are reduced to less than about 200 microns, preferably less than about 100 microns, and more preferably less than about 70 microns. Particles may be classified continuously during comminution or thereafter. Fluid energy to the mill preferably is provided by compressed, purified air or other gases.

Contamination typically is removed by oxidation for 1 hour at a temperature between about 500°–1000° C.

The calcined and ground particles are suitable for use as fillers in products used to encapsulate electronic products, and other uses wherein high purity fused silica is required, such as crucibles and diffusion tubes. Pelletized and calcined silica particles having relatively high specific surface area also are useful as catalyst support.

The specific surface area of calcined products is controlled by adjusting calcination conditions and by preselecting the specific surface area of the feed silica. The pore structure collapses as temperature is increased, and this collapse is dramatic as the temperatures increase from about 1000° C. to about 1400° C. Therefore, calcining only to the lower preferred temperature for the shortest periods will yield a product having a relatively high specific area. Of course, as disclosed herein, such a product will have a specific gravity at the low end of the range, as mild densification will have occurred. Similarly, the product of a feed having a relatively high specific surface area, such as silicas produced by sol-gel techinques, will have relatively high specific surface area if less severely calcined, as described above.

The following examples are intended to further illustrate the invention, not to limit the invention in any way. The invention is limited only by the scope of the appended claims.

EXAMPLES

Silica produced by continuous ammoniation of 13–15 wt. percent ammonium fluosilicate solution to precipitate silica was completely oven-dried. Then, high purity water was added and mixed by hand. To avoid contamination, talc-free gloves were used during the manual mixing, and only fused quartz or Teflon ® trays and beakers were utilized.

Moist silica was placed on a polyurethane-coated 14 inch diameter, 2.5 inch lip height pelletization disc disposed at a 45° angle. The disk was rotated at 24 rpm, and polyurethane scraper was used to prevent silica from sticking to the disc. Such pelletizers and the principles underlying their operation are known in the art. The position of the scraper on the disc was adjusted to obtain the desired cascading action of the material on the disc. Occasionally, high purity water was sprayed on the disc to promote increased pelletization. Precautions were taken to minimize contamination in the system.

Pellet size was controlled to between about 8 and 100 mesh (149 microns to 2.38 millimeters) by controlling the quantity of water and the residence time on disc. Typically, about 250 grams of silica and 120 wt. percent (300 grams) water achieved the desired pellet size in less than about 10 minutes.

EXAMPLE I

To determine the suitability of various materials as saggers for the calcination furnaces, approximately 50 grams of pelletized silica was placed in a sagger and calcined at 1200° C. in air for one hour in saggers identified below. The quantity of silica was adjusted, depending upon the size of the sagger. Because the saggers were supplied in different dimensions and shapes, an attempt was made to maintain a constant height and contact area for each silica/sagger test.

Table 1 summarizes analyses of silica before and after calcination in alumina saggers. The high aluminum, sodium, and uranium levels in the calcined silica preclude use of such saggers. It is believed that sodium was liberated from an agent which is used in the process whereby these saggers were manufactured, and that the uranium level results from the uranium level in the bauxite.

TABLE 1

| Element, ppm | Before Calcination | After Calcination |
|---|---|---|
| Al | 1.5 | 26.0 |
| Ca | 0.0 | 0.3 |
| Co | 0.0 | T |
| Cr | 0.0 | T |
| Cu | 0.0 | T |
| Fe | 0.4 | 0.5 |
| Mg | 0.0 | 0.5 |
| Mn | 0.0 | 0.1 |
| Ni | 0.0 | 0.1 |

TABLE 1-continued

| Element, ppm | Before Calcination | After Calcination |
|---|---|---|
| P | 0.4 | 0.4 |
| Na | 1.2 | 25.0 |
| K | 0.0 | 1.8 |
| U (ppb) | <1.0 | 4–7 |

T = less than 0.1

Table 2 summarizes analyses of silica before and after calcination in saggers made of various materials. The table illustrates the preference for quartz (without regard to operating temperature limitations) and silicon carbide (CRYSTAR ®-brand (Norton Company) standard grade and high purity grade recrystallized silicon carbide) saggers. The other silicon carbide-containing products are unsatisfactory. Furthermore, high aluminum levels preclude use of pressed mullite saggers.

TABLE 2

| | Feed (Before Calcining) | Quartz | CRYSTAR | CRYSTAR High Purity | Pressed Mullite | Silicon Carbide Oxynitride Bonded | Silicon Carbide Nitride Bonded | Silicon Carbide Zirconia Bonded |
|---|---|---|---|---|---|---|---|---|
| Al | 0.45 | 0.57 | 0.42 | 0.40 | 21.0 | 13.6 | 1.0 | 1.6 |
| Ca | 0.75 | 0.76 | 0.74 | 0.86 | 0.90 | 103.6 | 1.8 | 1.0 |
| Co | T | T | T | T | T | T | T | T |
| Cr | T | T | T | T | T | <0.12 | T | T |
| Cu | 0.10 | T | <0.15 | 0.14 | 0.16 | 1.2 | 1.1 | 0.33 |
| Fe | 1.3 | 1.6 | 2.0 | 1.9 | 1.8 | 48.9 | 8.4 | 5.4 |
| Mg | 0.31 | 0.10 | T | 0.12 | 0.20 | 5.1 | 0.8 | 0.6 |
| Mn | 0.10 | 0.10 | T | T | 0.15 | 5.2 | 0.3 | 0.27 |
| Ni | 0.16 | T | 1.20 | 0.10 | T | 1.0 | 0.56 | T |
| P | 0.29 | 0.17 | 0.95 | 1.6 | 0.50 | 5.7 | 1.0 | 1.1 |
| Zn | 0.90 | 1.04 | 1.10 | 1.0 | 3.2 | 1.3 | <1.0 | 1.0 |
| Na | 0.20 | 0.40 | 0.70 | 2.0 | 9.8 | 11.6 | 1.5 | 3.0 |
| K | <0.20 | <0.20 | 0.50 | 1.8 | 1.5 | 12.2 | 9.1 | 9.2 |
| S | 4.8 | <1.0 | <1.0 | <2.0 | 4.3 | 6.6 | 2.8 | <2.0 |
| U | <1.0 ppb | <1.0 ppb | <1.0 ppb | — | — | — | — | — |
| Water Extractables | | | | | | | | |
| Na | <0.50 | <0.50 | <0.50 | <1.0 | <1.0 | <1.0 | <1.0 | <1.0 |
| K | <0.50 | <0.50 | <0.50 | <1.0 | <1.0 | <1.0 | <1.0 | <1.0 |
| Fe | <1.00 | <1.00 | <1.0 | <1.0 | <1.0 | <1.0 | <1.0 | <1.0 |
| F | 278 | 11.0 | 7.8 | 0.6 | 0.6 | 0.7 | 0.9 | 1.0 |
| NH₃ | 260 | 1.0 | 1.0 | <1.0 | <1.0 | <1.0 | <1.0 | <1.0 |

T = less than 0.1

EXAMPLE II

Twenty-five gram batches of pelletized silica were calcined in 2 stages under process conditions described below in a programmable alumina-tube furnace. The samples were prepared without regard for rates of heating and cooling (which were 9° C. per minute for both heating and cooling). (Although alumina is unsuitable for use in the method of this invention, such a furnace is useful for screening studies.) These tests were confirmed by calcining 200–300 gram batches in a muffle furnace. Saggers were fabricated from CRYSTAR ®, a recrystallized silicon carbide product of the Norton Company. At temperatures above 800° C., a helium atmosphere was wtilized.

TABLE 3

| Sample | Calcination Conditions Temp./Time °C./Hour & °C./Minutes | Bulk Density (g/cm³) Pelletized | Bulk Density (g/cm³) Ground | Fluorine (ppm, PB) Pelletized | Fluorine (ppm, PB) Ground | Remarks |
|---|---|---|---|---|---|---|
| 3A | 1100/6 & 1300/45 | 1.12 | 1.21 | 0.5 | 3.2 | T |
| 3B | 1100/6 & 1400/15 | 1.29 | 1.30 | 0.5 | 1.0 | C |
| 3C | 1100/6 & 1275/180 | 1.10 | 1.12 | 1.0 | 0.8 | T |
| 3D | 1100/12 & 1275/180 | 1.15 | 1.19 | 0.6 | 0.8 | C |
| 3E | 1100/12 & 1250/240 | 1.10 | 1.02 | 0.8 | 2.1 | N |
| 3F | 1100/12 & 1300/30 | 0.90 | 1.15 | 1.0 | 1.9 | N |

TABLE 3-continued

| Sample | Calcination Conditions Temp./Time °C./Hour & °C./Minutes | Bulk Density (g/cm³) Pelletized | Ground | Fluorine (ppm, PB) Pelletized | Ground | Remarks |
|---|---|---|---|---|---|---|
| 3G | 1000/12 & 1300/30 | 0.91 | 1.16 | 0.7 | 0.8 | N |
| 3H | 1000/12 & 1300/45 | 0.98 | 1.12 | 0.7 | 1.0 | N |
| 3I | 1000/12 & 1300/90 | 1.09 | 1.20 | 0.5 | 1.1 | N |
| 3J | 1000/12 & 1300/120 | 1.16 | 1.20 | 0.6 | 0.8 | T |

Note:
C: Cristobalite,
N: No Cristobalite,
T: Trace of Cristobalite
PB: Parr Bomb The data in Table 3 illustrate the tendency of cristobalite to form as the length of the densification phase or the calcination temperature increases (compare Samples G-J; A and B; D-F) and how density increases with length of densification. (Samples G-J; F). The data also illustrate the difference in average bulk density and fluorine content of untreated (unground) pellets and ground product, which was treated to remove polyurethane introduced in the grinding step.

EXAMPLE III

The importance of the rate of temperature changes is clearly illustrated in Table 4 below, which summarizes the effect of these rates, and of the length of densification period. The samples were calcined in helium at 1100° C. for 6 hours, then the temperature was raised to 1400° C. at the rate and for the time described in the table. Sample 4A is identical to Sample 3B. The table summarizes data on ground products.

TABLE 4

| Sample | Heating Rate (°C./min) | Cooling Rate (°C./min) | Time at 1400° C. (Min.) | Bulk Density (g/cm³) | Fluorine (wppm, PB) | Remarks |
|---|---|---|---|---|---|---|
| 4A | 9 | 9 | 15 | 1.30 | 1.0 | C |
| 4B | 30 | 9 | 15 | 1.28 | 4.4 | T |
| 4C | 30 | 30 | 7.5 | 1.30 | 1.4 | N |
| 4D | 30 | 30 | 15 | 1.34 | 1.4 | N |
| 4E | 30 | 30 | 30 | 1.37 | 6.8 | T |

Note:
C: Cristobalite,
N: No Cristobalite,
T: Trace of Cristobalite
PB: Parr Bomb

EXAMPLE IV

Figure 2:
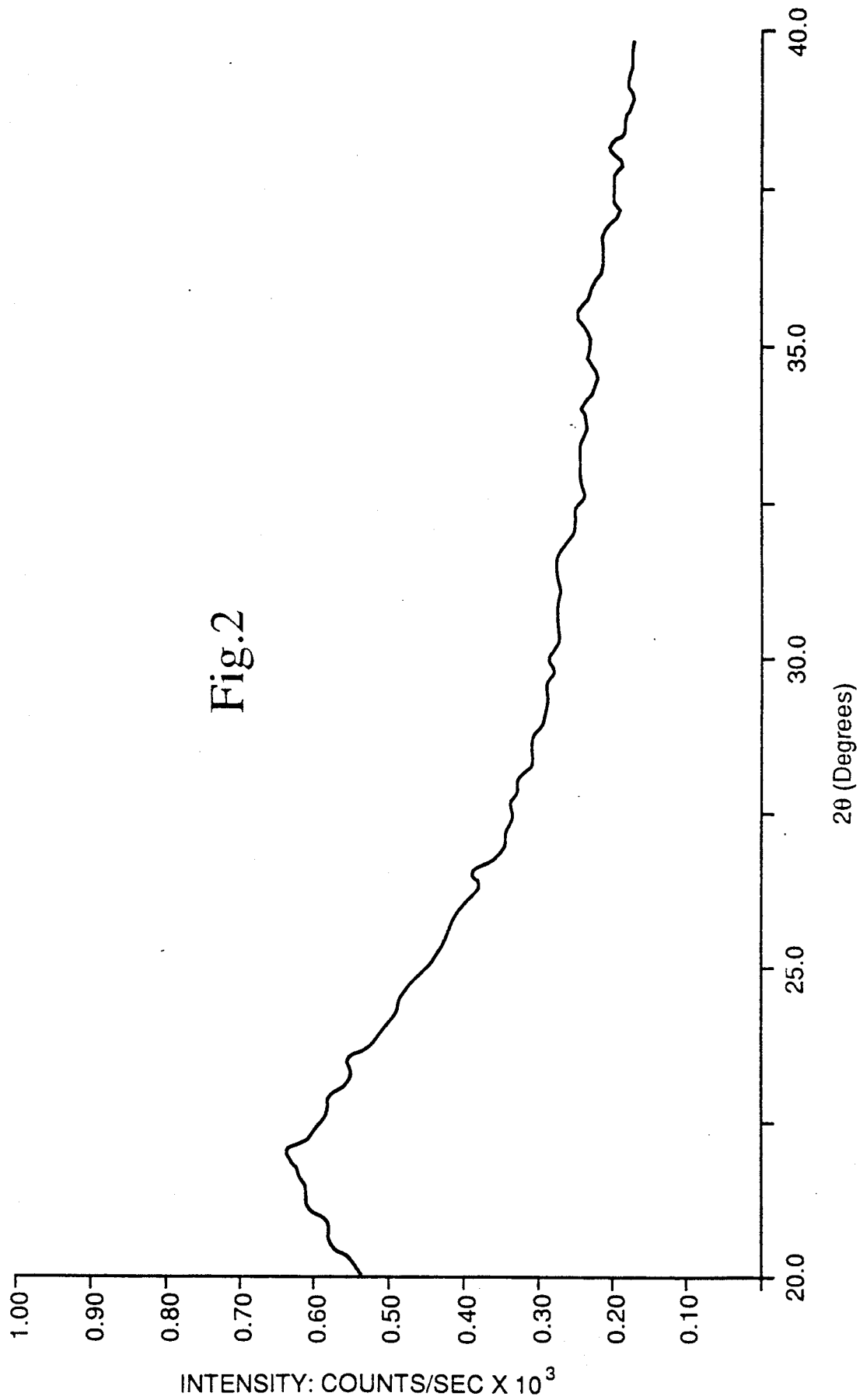
Figure 3:
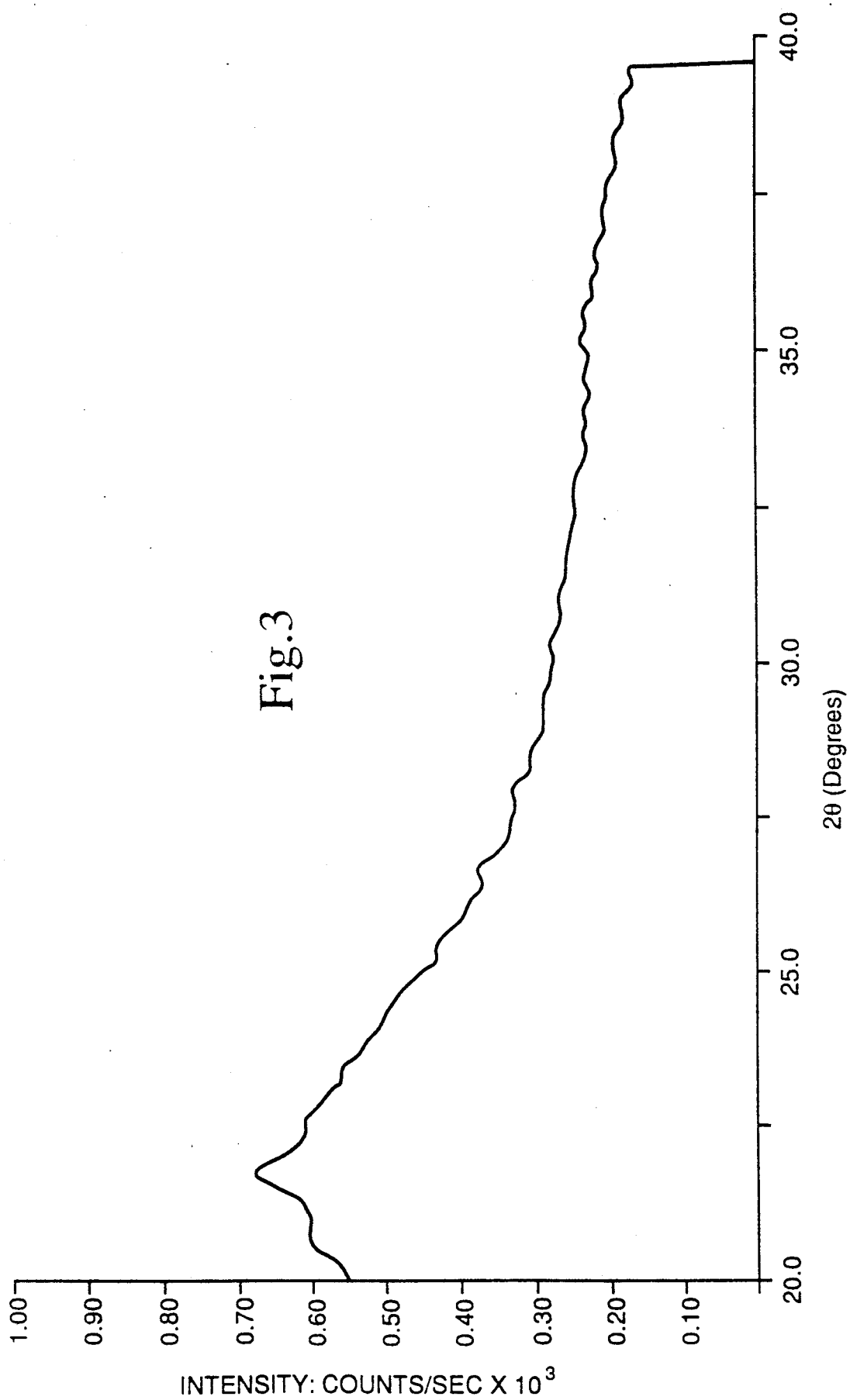
Figure 4:
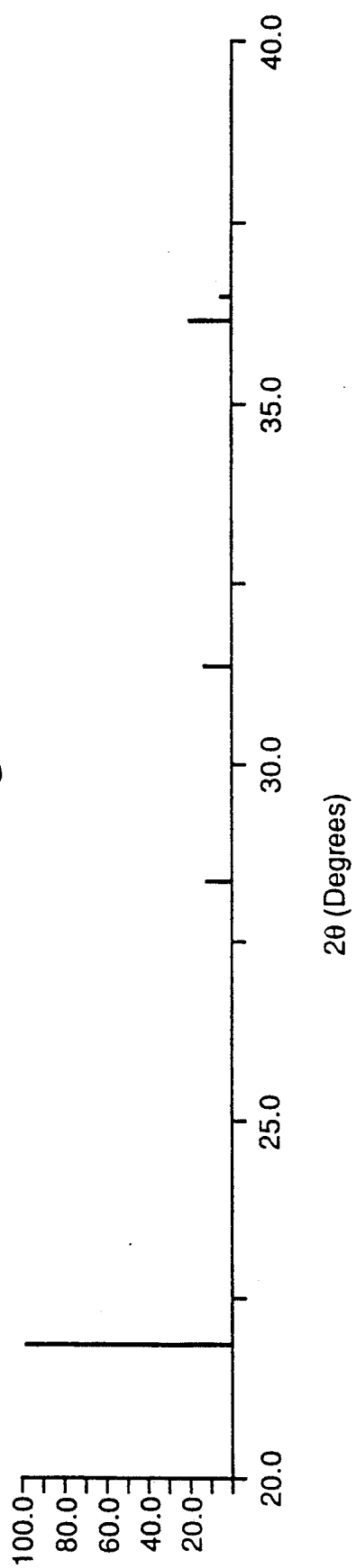
FIG. 4 is the x-ray pattern of crystabalite in JCPDS file No. 11-695.

The effect of the composition of the atmosphere during calcination is clearly illustrated in FIGS. 1-3. Pelletized silica samples were separately calcined in air (FIG. 1), helium (FIG. 2), or nitrogen (FIG. 3) at 1100° C. for 6 hours, followed by 1275° C. for 3 hours. X-ray diffraction patterns (Cu-K-alpha radiation) of each sample, shown in FIG. 1, clearly illustrate that, after identical processing regimes, Sample A (air) exhibits a significant crystalline phase, whereas Samples B and C (helium and nitrogen) show little if any, crystalline phase. The x-ray diffraction pattern for pure cristobalite is also illustrated.

EXAMPLE V

To demonstrate that high purity of silica can be effectively maintained by following the grinding technique described in this invention, samples of high purity fused silica were ground in a polyurethane-lined air-jet mill (Model Gem T—Garlock, Inc., Friends Lane, Newtown, PA 18940). Operating conditions were selected based on manufacturer's instructions.

Polyurethane contamination introduced during grinding was removed by calcining the silica at 1000° C. for one hour in an oxidizing atmosphere in a box furnace containing pure quartz saggers. Thus-calcined particles had a loss on ignition of less than 0.05 percent.

Chemical analyses of several silica samples before and after grinding (and polyurethane removal) are presented in Table 5. These data clearly demonstrate that silica purity is maintained during grinding. Analysis indicated that every feed and ground product contained less than 1 ppb of uranium.

TABLE 5

| | Analysis of Silica (in ppm) before and after Grinding (and Calcination) in an Air-Jet Mill | | | | | | | | | | | | | |
|---|---|---|---|---|---|---|---|---|---|---|---|---|---|---|
| | Al | Ca | Cr | Cu | Fe | Mg | Mn | Ni | P | S | Zn | Na | K | F* |
| Fused Silica | 0.35 | 1.28 | 0.04 | 0.09 | 2.93 | 0.15 | 0.10 | 0.12 | 0.21 | 0 | 0.23 | 1.0 | 0.4 | 0.8 |
| Ground Silica | 0.20 | 1.33 | 0 | 0.04 | 3.01 | 0.01 | 0.10 | 0.15 | 0.15 | 0.13 | 0.20 | 1.0 | 0.4 | 1.2 |
| Fused Silica | 0.57 | 0.92 | 0.05 | 0.03 | 2.66 | 0.05 | 0.05 | 0.08 | 0.17 | 0.57 | 0.09 | 0.5 | 0.2 | 0.9 |
| Ground Silica | 0.16 | 1.13 | 0.01 | 0.03 | 2.85 | 0.01 | 0 | 0.15 | 0.40 | 0 | 0.09 | 0.2 | 0.4 | 2.9 |
| Fused Silica | 0.18 | 1.04 | 0.10 | 0.03 | 2.85 | 0.09 | 0.06 | 0.09 | 0.02 | 0.86 | 0.10 | 0.2 | 0.2 | 0.5 |
| Ground Silica | 0.21 | 1.03 | 0.17 | 0.04 | 4.51 | 0 | 0.17 | 0.08 | 0.05 | 0.17 | 0.21 | 0.7 | 0.2 | 1.0 |
| Fused Silica | 1.97 | 1.28 | 0.02 | 0.04 | 3.26 | 0.12 | 0.07 | 0.03 | 0 | 0.9 | 0.1 | 0.4 | 1.1 | 1.4 |
| Ground Silica | 1.13 | 1.23 | 0.05 | 0.07 | 2.54 | 0.05 | 0.07 | 0.07 | 0.21 | 0.72 | 0.11 | 0.2 | 0.8 | 2.3 |
| Fused Silica | 0.19 | 0.87 | 0.04 | 0.05 | 2.42 | 0.05 | 0.05 | 0.09 | 0.07 | 1.29 | 0.08 | 0.2 | 0.2 | 0.8 |
| Ground Silica | 1.69 | 0.87 | 0 | 0.06 | 2.74 | 0.07 | 0.05 | 0.09 | 0.26 | 1.87 | 0.14 | 0.6 | 1.3 | 0.7 |
| Fused Silica | 0.05 | 1.16 | 0.03 | 0.04 | 2.37 | 0 | 0.07 | 0.09 | 0.11 | 0 | 0.09 | 0.4 | 0.7 | 1.8 |

TABLE 5-continued

Analysis of Silica (in ppm) before and after Grinding (and Calcination) in an Air-Jet Mill

| | Al | Ca | Cr | Cu | Fe | Mg | Mn | Ni | P | S | Zn | Na | K | F* |
|---|---|---|---|---|---|---|---|---|---|---|---|---|---|---|
| Ground Silica | 0.57 | 1.47 | 0.08 | 0.08 | 1.99 | 0.11 | 0.04 | 0.13 | 0.34 | 0.19 | 0.15 | 0.4 | 1.3 | 1.1 |
| Fused Silica | 0 | 1.61 | 0.03 | 0.04 | 2.42 | 0.05 | 0.04 | 0.04 | 0 | 0.49 | 0.12 | 0.4 | 0.2 | 1.7 |
| Ground Silica | 0.41 | 1.40 | 0.02 | 0.04 | 2.42 | 0.08 | 0.04 | 0.10 | 0.39 | 0.79 | 0.13 | 1.1 | 0.4 | 0.94 |

F* By the Parr Bomb Method (Extraction of 2 g sample with 20 ml of ultra-pure water at 160° C. for 20 hours)

Although preferred embodiments of the invention have been discussed herein, those skilled in the art will appreciate that changes and modifications may be made without departing from the spirit of this invention, as defined in and limited only by the scope of the appended claims.

I claim:

1. A method of producing pure and dense amorphous fused silica particles comprising:
   (a) agglomerating pure, synthetic amorphous silica to form agglomerated particles having a size of 5–2500 microns;
   (b) heating the agglomerated particles of step (a) to a temperature of between about 1000° and 1100° C. under an atmosphere inert to silica and essentially devoid of oxygen and water and maintaining said temperature for a for a period sufficient to volatize impurities said period being at least least about 0.5 hour at 1000° C. and shorter at higher temperatures;
   (c) raising the temperature of the treated particles of step (b) to between about 1250° and 1400° C. under an atmosphere inert to silica and essentially devoid of oxygen and water and maintaining the temperature for at least about 0.25 hours to achieve an average bulk density of at least about 0.9 g/cm$^3$; and
   (d) cooling the dense particles of step (c) to a temperature below about 1000° C.

2. The method of claim 1 wherein the agglomeration of step (a) is carried out in the presence of water in a quantity up to about 200 wt. percent based on the weight of dry silica.

3. The method of claim 2 wherein the quantity of water is between about 20 and 150 wt. percent based on the weight of dry silica.

4. The method of claim 3 wherein the water is steam.

5. The method of claim 1 wherein agglomeration is carried out in a tumbling device which has been coated with material which does not permanently contaminate the silica.

6. The method of claim 1 wherein the atmosphere of step (b) is selected from the group consisting of nitrogen, helium, argon, neon, krypton, xenon, and mixtures thereof.

7. The method of claim 6 wherein the period of step (b) is at least about 0.5 hours.

8. The method of claim 7 wherein the period of step (b) is between about 0.5 and 12 hours.

9. The method of claim 7 wherein the period of step (c) is between about 0.5 and 2.5 hours.

10. The method of claim 8 wherein the period of step (c) is between about 0.5 and 2.5 hours.

11. The method of claim 1, further comprising comminuting the cooled particles of step (d) to yield particles smaller than about 200 microns.

12. The method of claim 11 wherein the cooled particles are comminuted to particles smaller than about 100 microns.

13. The method of claim 12 wherein the cooled particles are comminuted to particles smaller than about 75 microns.

14. The method of claim 8, further comprising comminuting the cooled particles of step (d) to yield particles smaller than about 200 microns.

15. The method of claim 10, further comprising comminuting the cooled particles of step (d) to yield particles smaller than about 200 microns.

16. The method of claim 11 wherein the average bulk density after size reduction is at least about 1.2 g/cm$^3$.

17. The method of claim 1 wherein the rate of temperature increase of step (c) and the cooling rate of step (d) are at least about 9° C. per minute.

18. The method of claim 17 wherein each rate of temperature change is at least about 20° C. per minute.

19. The method of claim 18 wherein each rate of temperature change is at least about 30° C. per minute.

20. The method of claim 17 wherein the agglomeration of step (a) is carried out in the presence of water at a quantity between about 20 and 150 weight percent based on the weight of dry silica.

21. The method of claim 11 wherein the comminution is carried out in a fluid energy mill lined with a material which can be oxidized and further comprising oxidizing said material which contaminates the pure silica at a temperature between 500° and 1000° C. for up to about one hour to remove said material from the pure silica particles.

22. The method of claim 14 wherein the comminution is carried out in a fluid energy mill lined with a material which can be oxidized and further comprising oxidizing said material which contaminates the pure silica at a temperature between 500° and 1000° C. for up to about one hour to remove said material from the pure silica particles.

23. The method of claim 15 wherein the comminution is carried out in a fluid energy mill lined with a material which can be oxidized and further comprising oxidizing said material which contaminates the pure silica at a temperature between 500° and 1000° C. for up to about one hour to remove said material from the pure silica particles.

24. A method of producing pure and dense amorphous fused silica particles comprising:
   (a) agglomerating synthetic amorphous silica with water and essentially completely evaporating the water to form agglomerated particles having a size of 5–2500 microns;
   (b) heating the particles of step (a) to a temperature of between about 1000° and 1100° C. under an atmosphere selected from the group consisting of nitrogen, helium, argon, neon, krypton, xenon, and mixtures thereof, and which is essentially devoid of oxygen and water, for a period of at least about 0.5 hours;

(c) raising the temperature of the treated particles of step (b) at a rate of at least about 20° C. per minute to between about 1250° and 1400° C. under an atmosphere selected from the group consisting of nitrogen, helium, argon, neon, krypton, xenon, and mixtures thereof, and which is essentially devoid of oxygen and water, and maintaining the temperature for at least about 0.25 hours to achieve an average bulk density of at least about 1.0 g/cm$^3$; and (d) cooling the dense particles of step (c) to a temperature below about 1000° C. at a rate of at least about 20° C. per minute.

25. The method of claim 24 wherein the rates of temperature change of steps (c) and (d) are at least about 30° C. per minute.

26. The method of claim 24, further comprising comminuting the cooled particles of step (d) to yield particles smaller than about 200 microns and having an average bulk density greater than about 1.2 g/cm$^3$.

27. The method of claim 25, further comprising comminuting the cooled particles of step (d) to yield particles smaller than about 200 microns and having an average bulk density greater than about 1.2 g/cm$^3$.

* * * * *